US012738632B2

(12) United States Patent
Yao et al.

(10) Patent No.: US 12,738,632 B2
(45) Date of Patent: Sep. 15, 2026

(54) ELECTRONIC DEVICE AND ANTENNA STRUCTURE

(71) Applicant: WISTRON NEWEB CORPORATION, Hsinchu (TW)

(72) Inventors: De-Shao Yao, Hsinchu (TW); Chih-Feng Tai, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 52 days.

(21) Appl. No.: 18/650,543

(22) Filed: Apr. 30, 2024

(65) Prior Publication Data

US 2025/0125516 A1 Apr. 17, 2025

(30) Foreign Application Priority Data

Oct. 11, 2023 (TW) ................................ 112138655

(51) Int. Cl.
*H01Q 1/22* (2006.01)
*H01Q 1/48* (2006.01)
(Continued)

(52) U.S. Cl.
CPC ............ *H01Q 1/2266* (2013.01); *H01Q 1/48* (2013.01); *H01Q 5/307* (2015.01); *H01Q 13/10* (2013.01); *H01Q 21/06* (2013.01)

(58) Field of Classification Search
CPC ........ H01Q 1/48; H01Q 1/2266; H01Q 5/307; H01Q 13/10; H01Q 21/06; H01Q 9/42; H01Q 1/22; H01Q 5/371; H01Q 13/106; H01Q 1/38; H01Q 1/243; H01Q 1/2258; H01Q 13/16; H01Q 21/064
See application file for complete search history.

(56) References Cited

U.S. PATENT DOCUMENTS 9,929,473 B2 * 3/2018 Huang ................ H01Q 13/106
12,362,459 B2 * 7/2025 Yoon ...................... H01Q 1/243
(Continued)

FOREIGN PATENT DOCUMENTS

| | | | | |
|---|---|---|---|---|
| TW | I266451 | B | | 11/2006 |
| TW | I646727 | B | * | 1/2019 |
| TW | 201906228 | A | | 2/2019 |

OTHER PUBLICATIONS

TW-I646727-B Translation (Year: 2019).*

*Primary Examiner* — Dameon E Levi
*Assistant Examiner* — Gurbir Singh
(74) *Attorney, Agent, or Firm* — McClure, Qualey & Rodack, LLP

(57) ABSTRACT

An electronic device includes a housing and an antenna structure. The housing includes a first slot and a second slot. The first slot and the second slot extend along a same direction. The first slot has a first closed end and a second closed end. The second slot has a third closed end and an open end. The antenna structure is disposed in the housing. The antenna structure includes a grounding element, a first radiating element, and a second radiating element. The first radiating element has a first end and a second end, the first end is connected to the grounding element, and the second end is located between the third closed end and the open end. An orthogonal projection of the first radiating element that is projected onto the housing overlaps with and crosses on the first slot.

16 Claims, 7 Drawing Sheets

(51) Int. Cl.
*H01Q 5/307* (2015.01)
*H01Q 13/10* (2006.01)
*H01Q 21/06* (2006.01)

(56) References Cited

U.S. PATENT DOCUMENTS

2022/0094060 A1* 3/2022 Chang .................... H01Q 5/385
2023/0035417 A1* 2/2023 Hung ....................... H01Q 1/38

* cited by examiner

ELECTRONIC DEVICE AND ANTENNA STRUCTURE

CROSS-REFERENCE TO RELATED PATENT APPLICATION

This application claims the benefit of priority to Taiwan Patent Application No. 112138655, filed on Oct. 11, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna structure, and more particularly to an electronic device and an antenna structure capable of enhancing the antenna characteristics.

BACKGROUND OF THE DISCLOSURE

Currently, electronic devices, such as laptop computers, are designed toward being thinner and more lightweight, while maintaining high levels of performance. Since there is a tendency for an outer appearance of the laptop computer to be designed with a narrow screen frame, an internal space of the laptop computer for placing an antenna is insufficient, such that a designed antenna has poor antenna characteristics.

In addition, conventional dual-closed slots are usually formed in the metal frame to cooperate with the antenna structure disposed inside the electronic device to generate an appropriate operating frequency range. However, the required antenna area and slot size are too large in this case to be installed in a limited space inside the electronic device.

Therefore, how to overcome the above-mentioned problem through an improvement in structural design has become an important issue to be addressed in the related art.

SUMMARY OF THE DISCLOSURE

In response to the above-referenced technical inadequacies, the present disclosure provides an electronic device and an antenna structure thereof for an antenna to maintain the antenna characteristics while being suitable for the narrow frame of the electronic device.

In order to solve the above-mentioned problems, one of the technical aspects adopted by the present disclosure is to provide an electronic device. The electronic device includes a housing and an antenna structure. The housing includes a first slot and a second slot. The first slot and the second slot extend along a same direction. The first slot has a first closed end and a second closed end, and the second slot has a third closed end and an open end. The antenna structure is disposed in the housing. The antenna structure includes a grounding element, a first radiating element, and a second radiating element. The first radiating element has a first end and a second end. The first end is connected to the grounding element, and the second end is located between the third closed end and the open end. An orthogonal projection of the first radiating element that is projected onto the housing overlaps with and crosses on the first slot. The second radiating element is electrically connected to a feeding element.

In order to solve the above-mentioned problems, another one of the technical aspects adopted by the present disclosure is to provide an antenna structure that is disposed in a housing of an electronic device. The housing includes a first slot and a second slot. The first slot and the second slot extend along a same direction. The first slot has a first closed end and a second closed end, and the second slot has a third closed end and an open end. The antenna structure includes a grounding element, a first radiating element, and a second radiating element. The first radiating element has a first end and a second end. The first end is connected to the grounding element, and the second end is located between the third closed end and the open end. An orthogonal projection of the first radiating element that is projected onto the housing overlaps with and crosses on the first slot. The second radiating element is electrically connected to a feeding element.

Therefore, in the electronic device and the antenna structure provided by the present disclosure, by virtue of "the housing including a first slot and a second slot, the first slot having a first closed end and a second closed end, the second slot having a third closed end and an open end," "an orthogonal projection of the first radiating element that is projected onto the housing overlapping with and crossing on the first slot," and "the second radiating element being electrically connected to a feeding element," the radiator of the antenna structure can be coupled to the open slot to generate a high frequency band for improving the antenna characteristics in a high frequency range, and the radiator of the antenna structure can be coupled to a closed slot to generate a low frequency band, such that the antenna structure is suitable for the narrow frame of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
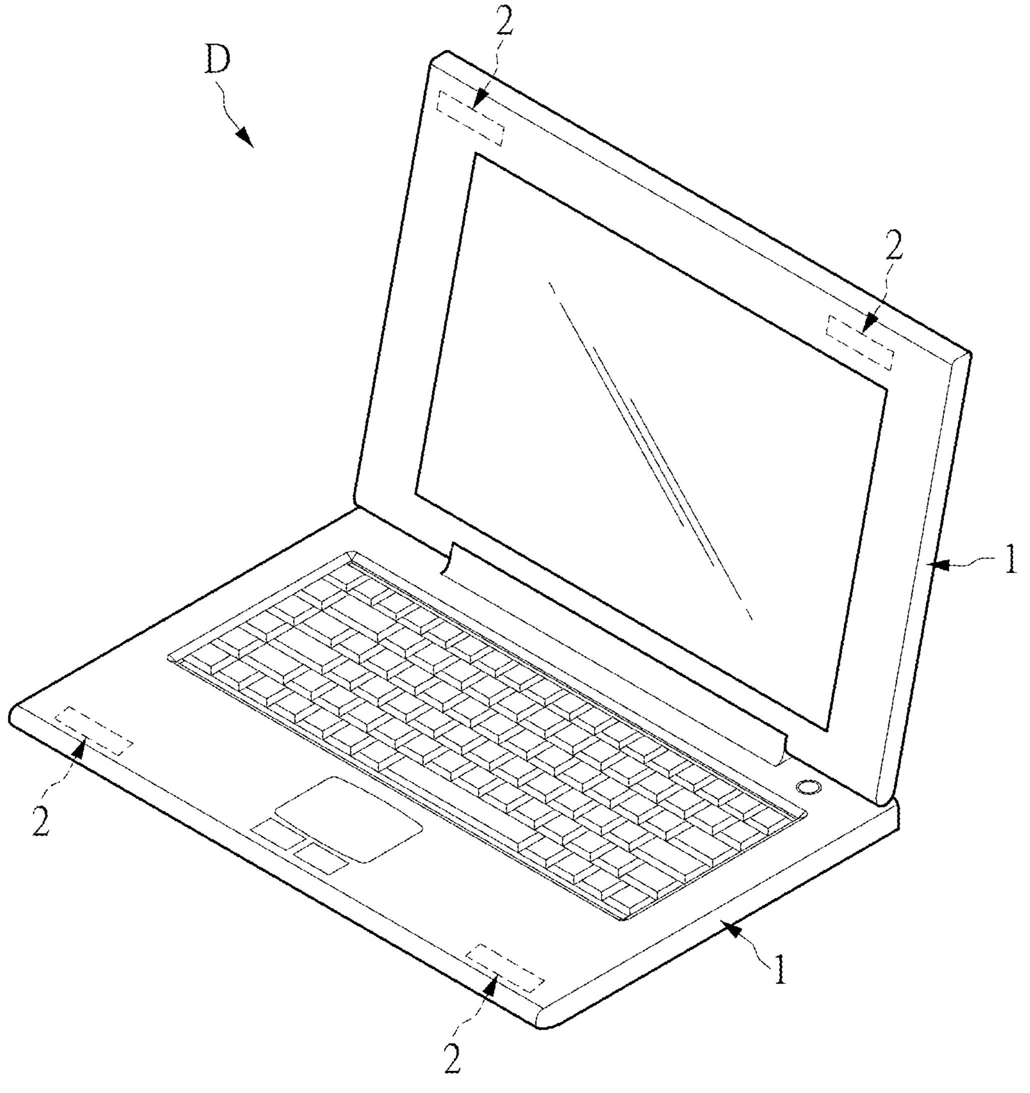
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

First Embodiment

Referring to FIG. 1, FIG. 1 is a schematic view of an electronic device according to the present disclosure. The present disclosure provides an electronic device D, and the electronic device D can be a smart phone, a tablet computer, or a laptop computer. However, the present disclosure is not limited thereto. In the present disclosure, the electronic device D is exemplified as the laptop computer. The electronic device D includes a housing 1 (at least part of the housing 1 can be a metal housing) and an antenna structure 2 that is disposed in the housing 1. For example, the antenna structure 2 is disposed at a position of a screen frame of the electronic device D and a side of a keyboard of the electronic device D close to the user, but the position and quantity of the antenna structure 2 in the electronic device D are not limited in the present disclosure.

Figure 2:
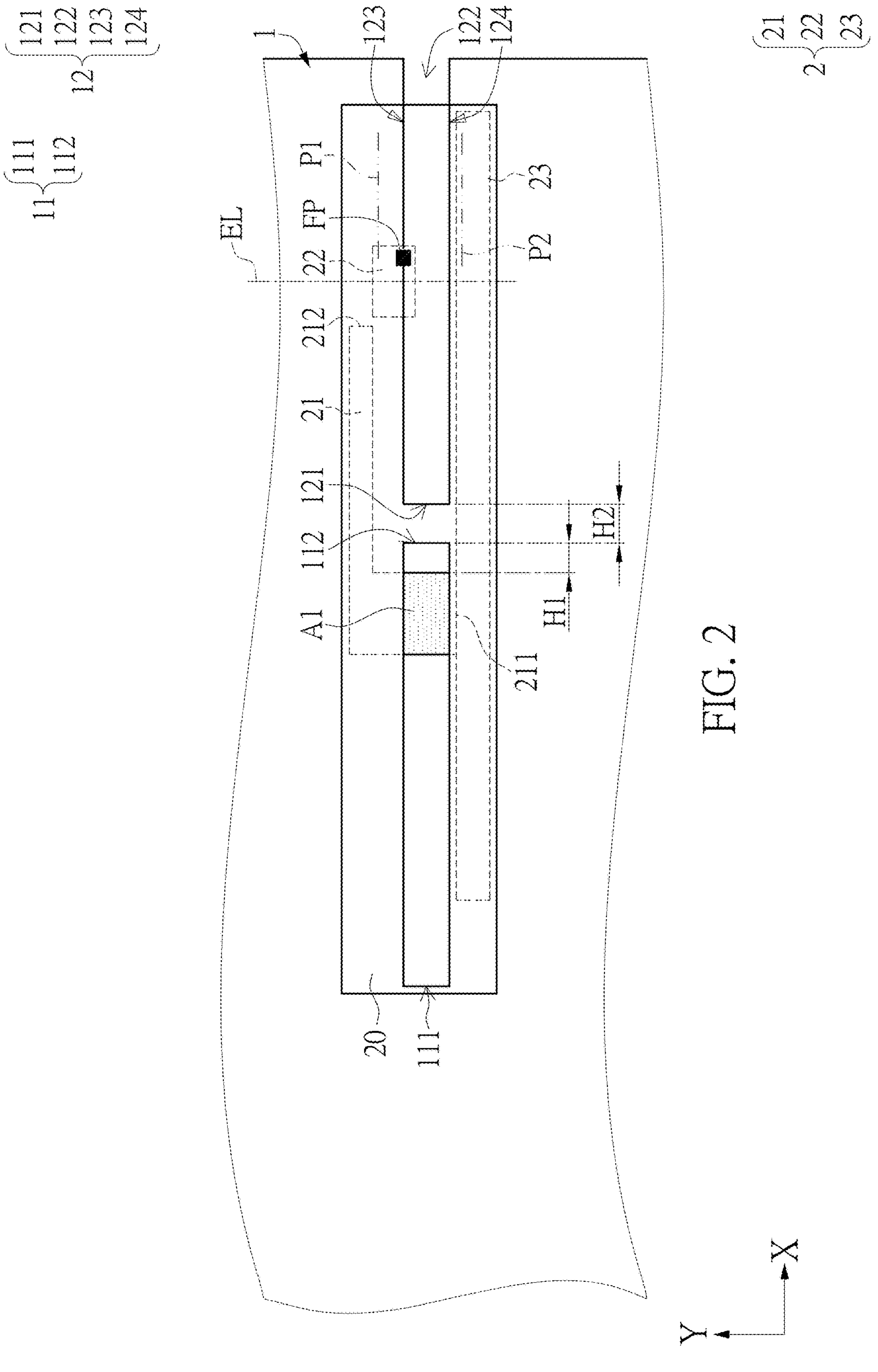
FIG. 2 is a schematic view of an antenna structure and a housing according to a first embodiment of the present disclosure.
Figure 3:
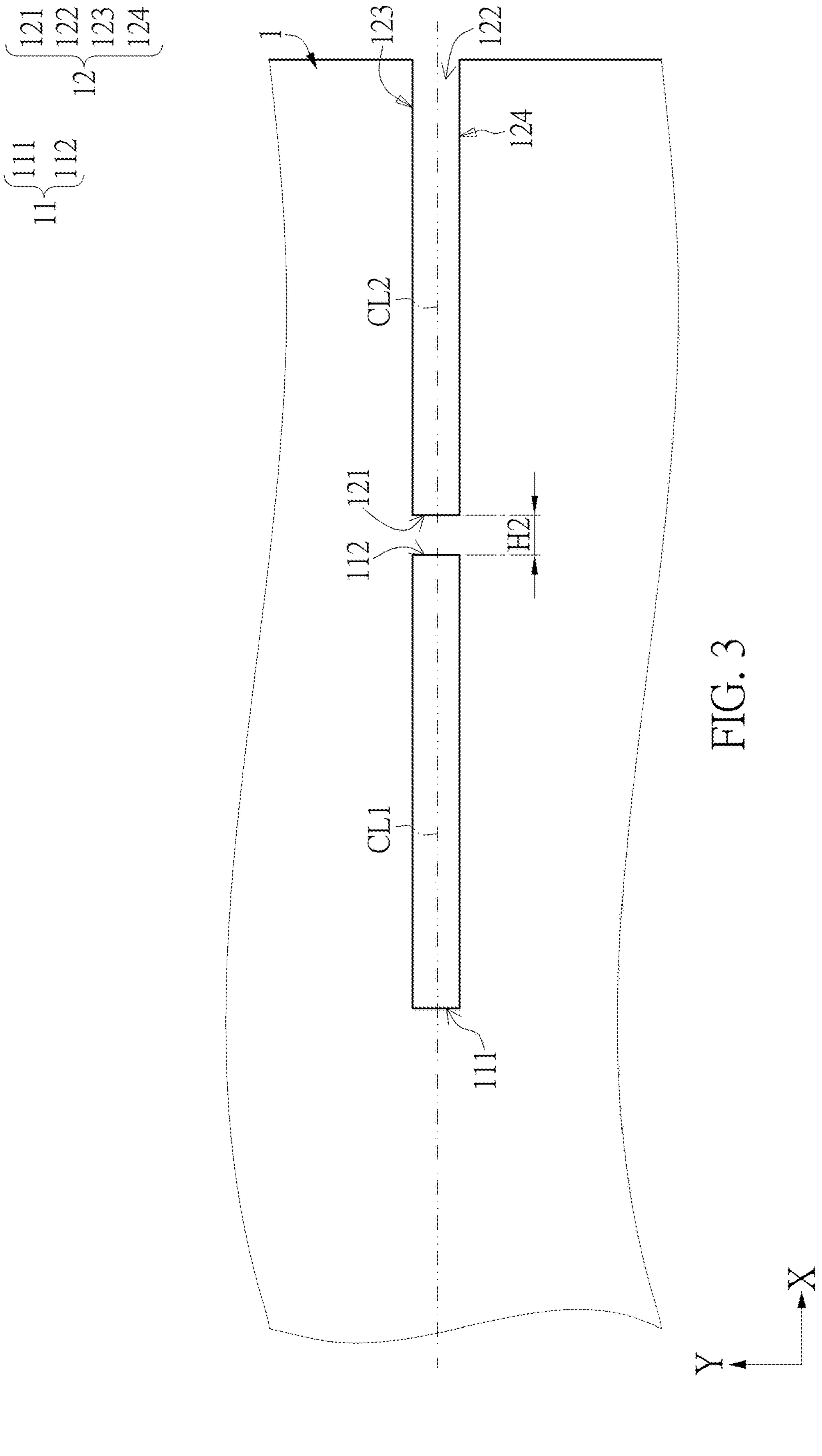
FIG. 3 is a schematic view of the housing according to the present disclosure.
Figure 4:
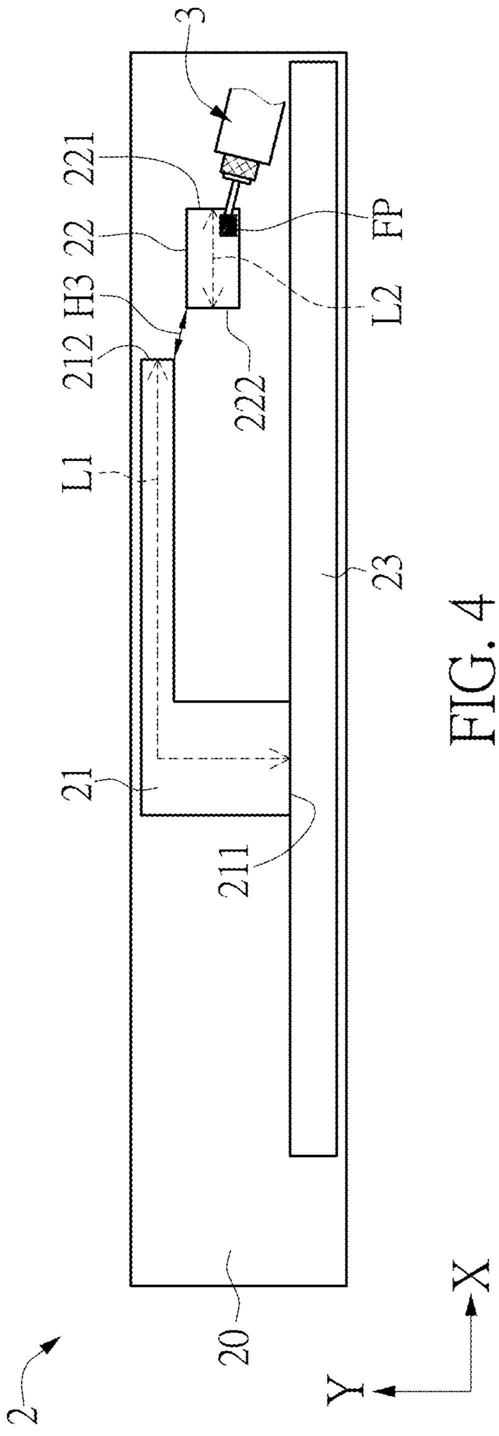
FIG. 4 is a schematic view of the antenna structure according to the first embodiment of the present disclosure.

Referring to FIG. 2 to FIG. 4, FIG. 2 is a schematic view of an antenna structure and a housing according to a first embodiment of the present disclosure, FIG. 3 is a schematic view of the housing according to the present disclosure, and FIG. 4 is a schematic view of the antenna structure according to the first embodiment of the present disclosure. As shown in FIG. 3, the housing 1 includes a first slot 11 and a second slot 12. The first slot 11 and the second slot 12 extend along a same direction. The first slot 11 has a first closed end 111 and a second closed end 112. The second slot 12 has a third closed end 121 and an open end 122. The second closed end 112 is located between the first closed end 111 and the third closed end 121. The second slot 12 further includes an upper edge 123 and a lower edge 124 that are connected between the third closed end 121 and the open end 122. Furthermore, a center line CL1 is defined along an extending direction of the first slot 11, and the center line CL1 is located between the upper edge 123 and the lower edge 124 of the second slot 12. Preferably, a center line CL2 is defined along an extending direction of the second slot 12, and the center line CL1 is aligned with the center line CL2, i.e., the first slot 11 and the second slot 12 have the same center line (CL1 or CL2).

As shown in FIG. 4, the antenna structure 2 includes a first radiating element 21, a second radiating element 22, and a grounding element 23, which are disposed on a substrate 20. For example, the first radiating element 21, the second radiating element 22, and the grounding element 23 can each be a metal sheet or other conductive materials that are electrically conductive, but the present disclosure is not limited thereto. The first radiating element 21 has a first end 211 and a second end 212, and the first end 211 is connected to the grounding element 23. The second radiating element 22 has a feeding point FP, and the second radiating element 22 is electrically connected to the feeding element 3 through the feeding point FP. Furthermore, the second radiating element 22 has a third end 221 and a fourth end 222, and the feeding point FP is located on a position close to the third end 221, but the position of the feeding point FP on the second radiating element 22 is not limited in the present disclosure. Therefore, the second radiating element 22 is electrically connected to the feeding element 3 through the third end 221. The grounding element 23 is grounded by being electrically connected to the housing 1.

FIG. 2 is an implementation mode after integrating the housing 1 of FIG. 3 and the antenna structure 2 of FIG. 4. For convenience of illustration, the feeding element 3 is omitted in FIG. 2. As shown in FIG. 2, when the antenna structure 2 is disposed in the housing 1, the antenna structure 2 corresponds to two slots (i.e., the first slot 11 and the second slot 12) on the housing 1, such that the antenna structure 2 and the two slots jointly form a dual-slot antenna. In addition, the number and position of the slots are configured corresponding to the antenna structure 2, but the present disclosure is not limited thereto.

As shown in FIG. 2, when the antenna structure 2 is disposed in the housing 1, the second end 212 of the first radiating element 21 is located between the third closed end 121 and the open end 122 of the second slot 12. Moreover, a center position between the third closed end 121 and the open end 122 defines a center line EL, which is an imaginary line. A horizontal position of the feeding point FP of the second radiating element 22 in an X-axis is located between the center line EL and the open end 122. A vertical position of the feeding point FP in a Y-axis is located between a first position P1 and a second position P2. The first position P1 is 2 mm above the upper edge 123 of the second slot 12, and the second position P2 is 1 mm below the lower edge 124 of the second slot 12.

An orthogonal projection of the first radiating element 21 that is projected onto the housing 1 partially overlaps with and crosses on the first slot 11. An orthogonal projection of the second radiating element 22 that is projected onto the housing 1 partially overlaps with the second slot 12. The first radiating element 21 and the first slot 11 are separated from and coupled with each other. The second radiating element 22 and the second slot 12 are separated from and coupled with each other. The first radiating element 21 and the second slot 12 are separated from and coupled with each other. Through the design of the orthogonal projections of the two radiating elements partially overlap with the two slots, the antenna structure 2 and the two slots are coupled with each other to generate at least one operating frequency band.

For example, the feeding element 3 is used to excite the second slot 12 to generate a first operating frequency band from 5,925 MHz to 7,125 MHz. The feeding element 3 is used to excite the second radiating element 22, such that the second radiating element 22 resonates with the second slot 12 to generate a second operating frequency band from 5,150 MHz to 5,925 MHz. The second operating frequency band is lower than the first operating frequency band. In addition, the feeding element 3 is used to feed a signal into the feeding point FP and excite the second radiating element 22, the second radiating element 22 is further coupled with the second slot 12, and the second slot 12 is coupled to the first radiating element 21 and the first slot 11. Therefore, the energy fed by the feeding element 3 is transmitted in a sequence of the second radiating element 22, the second slot 12, the first radiating element 21, and the first slot 11. The first radiating element 21, the second radiating element 22, the first slot 11, and the second slot 12 jointly generate a third operating frequency band from 2,400 MHz to 2,500 MHz. The third operating frequency band is lower than the first operating frequency band and the second operating frequency band.

As shown in FIG. 2 and FIG. 4, the first radiating element 21 extends from the first end 211 to the second end 212, and the first radiating element 21 has a first extending length L1 between the first end 211 and the second end 212. Specifically, the first extending length L1 is a length from a middle point of the first end 211 to a middle point of the second end 212. The second radiating element 22 extends from the third end 221 to the fourth end 222, and the second radiating element 22 has a second extending length L2 between the third end 221 and the fourth end 222. The second extending length L2 is a length from a middle point of the third end 221 to a middle point of the fourth end 222. The first extending length L1 is greater than the second extending length L2. The size of the radiating element and the slot is not limited in the present disclosure. For example, the first extending length L1 ranges between 8 mm and 15 mm, and the second extending length L2 ranges between 3 mm and 7 mm. For example, a length of the first slot 11 (i.e., a length between the first closed end 111 and the second closed end 112) ranges between 10 mm and 15 mm, and a length of the second slot 12 (i.e., a length between the third closed end 121 and the open end 122) ranges between 15 mm and 20 mm.

A length of the second radiating element 22 (i.e., the second extending length L2 between the third end 221 and the fourth end 222) is inversely proportional to the length of the second slot 12 (i.e., the length between the third closed end 121 and the open end 122). When the length of the second radiating element 22 increases, the length of the second slot 12 decreases. When the length of the second radiating element 22 decreases, the length of the second slot 12 increases. In addition, a length of the first radiating element 21 (i.e., the first extending length L1 between the first end 211 and the second end 212) is inversely proportional to the total length of the first slot 11 and the second slot 12. Therefore, the impedance matching and the radiation efficiency of the antenna mode generated by the dual-slot antenna can be adjusted by changing the length between the radiating element and the slot.

When the length of the second radiating element 22 (i.e., the second extending length L2) increases, the second operating frequency band generated by the second radiating element 22 is shifted to a low frequency range. When a width of the second radiating element 22 increases, a part of the projection of the second radiating element 22 that overlaps with the second slot 12 increases, such that the matching of the low frequency mode (i.e., the third operating frequency band) is improved, and the matching of the high frequency modes (i.e., the first and second operating frequency bands) is reduced.

When the length of the first radiating element 21 (i.e., the first extending length L1) increases, the third operating frequency band is shifted to the low frequency range. A projection A1 of the first radiating element 21 that is projected onto the housing 1 is separated from the second closed end 112 by a minimum horizontal distance H1. Therefore, the projection A1 of the first radiating element 21 that is projected onto the housing 1 does not exceed the second closed end 112, that is, the first radiating element 21 does not overlap with a space between the two slots or the second slot 12. In other words, a grounding end (i.e., the first end 211) of the first radiating element 21 does not exceed the second closed end 112 in the horizontal direction. Through the design of the projection A1 of the first radiating element 21 that is projected onto the housing 1 not exceeding the second closed end 112, the matching of the low frequency mode (i.e., the third operating frequency band) can avoid deterioration. Preferably, the minimum horizontal distance H1 ranges between 1 mm and 7 mm.

The second closed end 112 and the third closed end 121 are separated from each other by a gap H2. The gap H2 is a spacing between the first slot 11 and the second slot 12. Through the design of the gap H2, the impedance matching and the frequency offset of the dual-slot antenna can be adjusted. For example, when the gap H2 increases toward the open end 122 (i.e., the length of the first slot 11 is unchanged and the length of the second slot 12 is reduced), the low frequency mode (i.e., the third operating frequency band) moves toward a high frequency range. When the gap H2 increases toward the first closed end 111 (i.e., the length of the second slot 12 is unchanged and the length of the first slot 11 is reduced), the low frequency mode (i.e., the third operating frequency band) also moves toward the high frequency range. Preferably, the gap H2 ranges between 1 mm and 7 mm.

Figure 7:
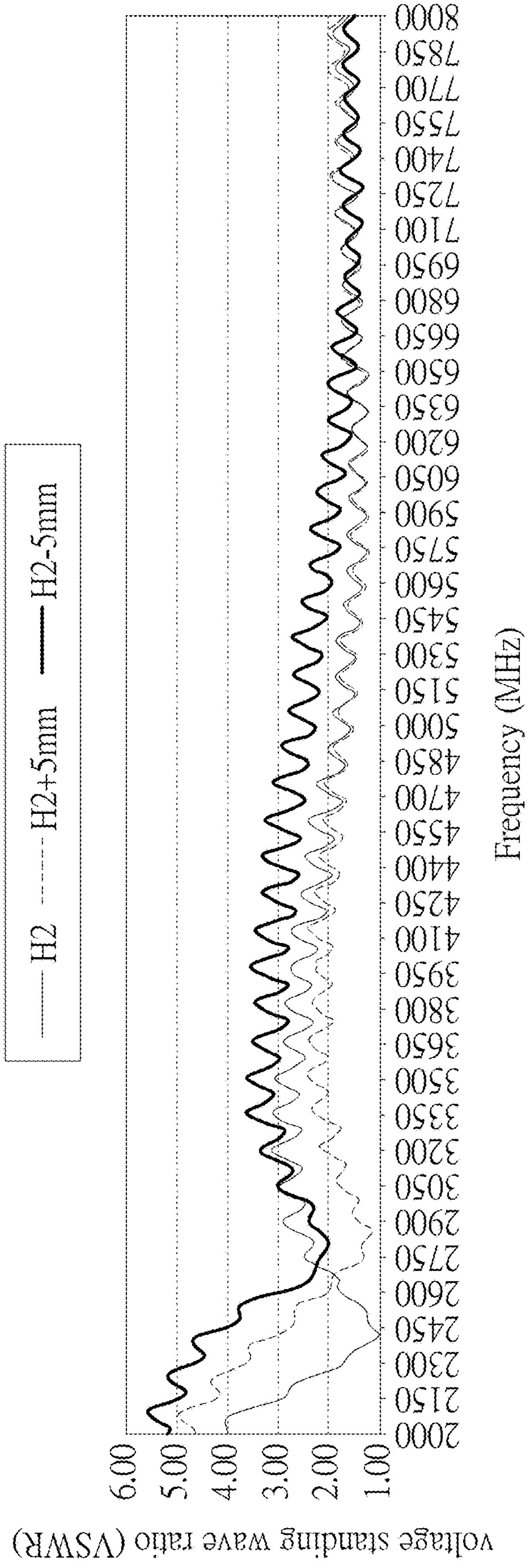
FIG. 7 is a curve diagram showing voltage standing wave ratios versus different gaps between the slots in the antenna structure of the present disclosure.

Referring to FIG. 2 and FIG. 7, FIG. 7 is a curve diagram showing voltage standing wave ratios versus different gaps between the slots in the antenna structure of the present disclosure. FIG. 7 shows different embodiments of the gap H2 in different dimensions. It should be noted that the gap H2+5 mm refers to the gap H2 being increased toward the open end 122 by 5 mm, and the distance H2−5 mm refers to the gap H2 being increased toward the first closed end 111 by 5 mm. When the gap H2 is increased toward the open end 122 or toward the first closed end 111, the low frequency mode (i.e., the third operating frequency band) moves toward the high frequency range. Furthermore, when the gap H2 is increased toward the first closed end 111, the length of the first slot 11 is reduced, and the projection A1 of the first radiating element 21 that is projected onto the housing 1 exceeds the second closed end 112, such that the overall matching effect of the antenna becomes worse.

As shown in FIG. 4, the first radiating element 21 and the second radiating element 22 are separated from each other by a minimum distance H3. Through the design of the minimum distance H3, the first radiating element 21 can be separated from the second radiating element 22 by at least one distance to avoid affecting the antenna characteristics. When the first radiating element 21 is too close to (or even overlaps with) the second radiating element 22, the antenna characteristics becomes worse. Preferably, the minimum distance H3 is greater than 0.3 mm.

Second Embodiment

Figure 5:
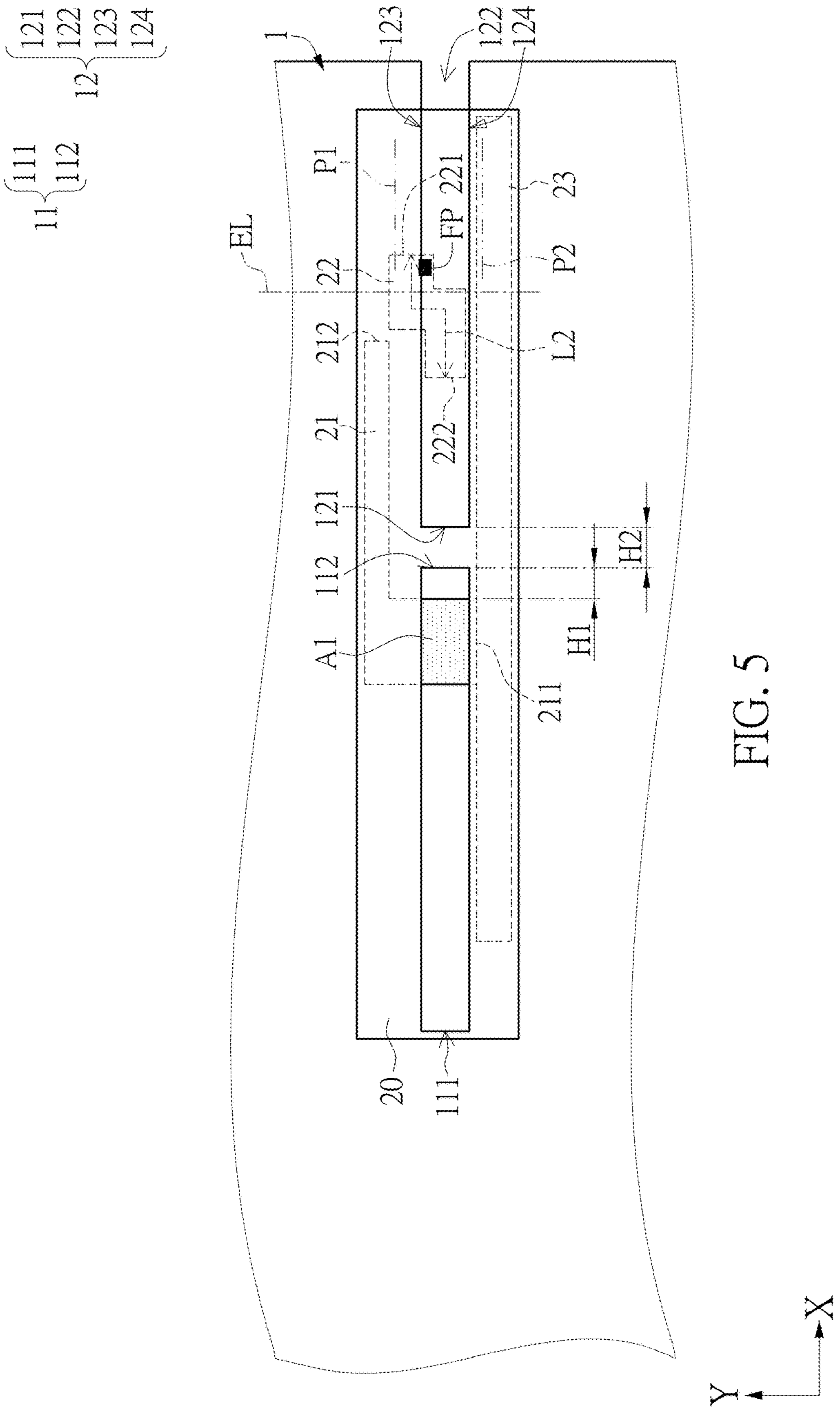
FIG. 5 is a schematic view of an antenna structure and a housing according to a second embodiment of the present disclosure.

Referring to FIG. 5, FIG. 5 is a schematic view of an antenna structure and a housing according to a second embodiment of the present disclosure. The antenna structure of the second embodiment has a structure similar to that of the first embodiment, and the similarities therebetween will not be reiterated herein. The main difference between the second embodiment and the first embodiment is as follows: the shape of the second radiating element 22 of the second embodiment is different from that of the first embodiment. Because the position of the feeding point FP on the second radiating element 22 can be adjusted according to different requirements, the shape of the second radiating element 22 can be changed accordingly to ensure that the projection of the second radiating element 22 that is projected onto the housing 1 partially overlaps with the second slot 12. For example, in FIG. 5, the second radiating element 22 forms a stepped shape. Comparing FIG. 5 with FIG. 2, the area of the second radiating element 22 is significantly enlarged. Correspondingly, the portion of the projection of the second radiating element 22 that overlaps with the second slot 12 is also increased, so as to ensure that the projection of the second radiating element 22 still partially overlaps with the second slot 12 to achieve the required coupling effect.

Third Embodiment

Figure 6:
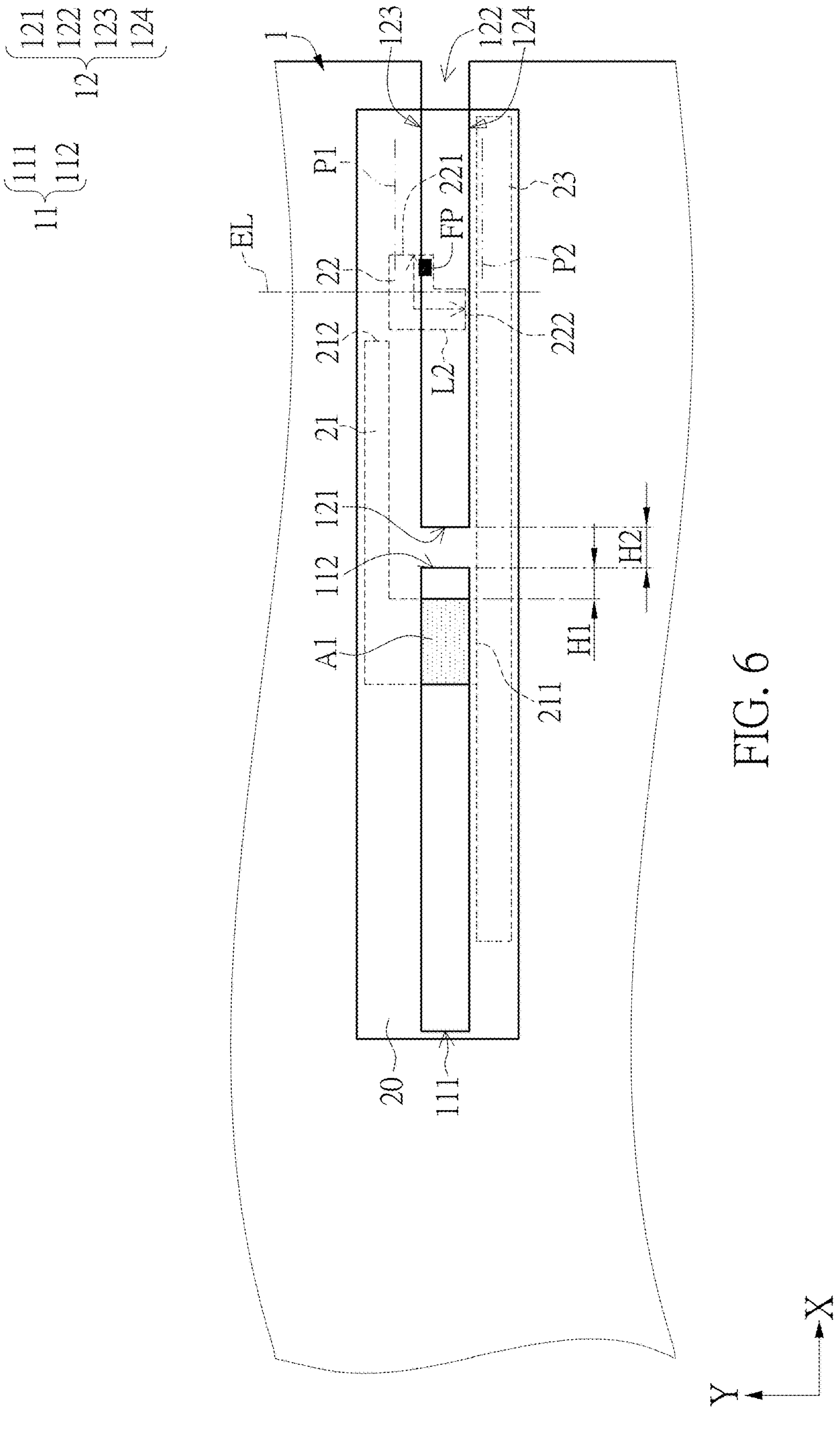
FIG. 6 is a schematic view of an antenna structure and a housing according to a third embodiment of the present disclosure.

Referring to FIG. 6, FIG. 6 is a schematic view of an antenna structure and a housing according to a third embodiment of the present disclosure. The antenna structure of the third embodiment has a structure similar to that of the first embodiment, and the similarities therebetween will not be reiterated herein. The main difference between the third embodiment and the first embodiment is as follows: the shape of the second radiating element 22 of the third embodiment is different from that of the first embodiment. In FIG. 6, the second radiating element 22 forms an inverted L-shape. Comparing FIG. 6 with FIG. 2, the area of the second radiating element 22 is significantly enlarged. Therefore, the portion of the projection of the second radiating element 22 that overlaps with the second slot 12 is also increased, so as to ensure that the projection of the second radiating element 22 still partially overlaps with the second slot 12 to achieve the required coupling effect.

Beneficial Effects of the Embodiments

In the electronic device and the antenna structure provided by the present disclosure, by virtue of "the housing 1 including a first slot 11 and a second slot 12, the first slot 11 having a first closed end 111 and a second closed end 112, the second slot 12 having a third closed end 121 and an open end 122," "an projection A1 of the first radiating element 21 that is projected onto the housing 1 overlapping with and crossing on the first slot 11," and "the second radiating element 22 being electrically connected to a feeding element 3," the radiator of the antenna structure can be coupled to the open slot to generate a high frequency band for improving the antenna characteristics in the high frequency range, and the radiator of the antenna structure can be coupled to the closed slot to generate the low frequency band, such that the antenna structure is suitable for the narrow frame of the electronic device.

Through the design of the projection A1 of the first radiating element 21 that is projected onto the housing 1 being separated from the second closed end 112 by the minimum horizontal distance H1, the matching of the low frequency mode (i.e., the third operating frequency band) can avoid deterioration. Through the design of the gap H2 between the two slots, the impedance matching and the frequency offset of the dual-slot antenna can be adjusted. Through the design of the minimum distance H3 between the first radiating element 21 and the second radiating element 22, the effect on the antenna characteristics can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:
a housing including a first slot and a second slot, wherein the first slot and the second slot extend along a same direction, the first slot has a first closed end and a second closed end, and the second slot has a third closed end and an open end; and
an antenna structure disposed in the housing and including:
a grounding element;
a first radiating element having a first end and a second end, wherein the first end is connected to the grounding element, the second end is located above and between the third closed end and the open end, an orthogonal projection of the first radiating element that is projected onto the housing partially overlaps with and crosses on the first slot, and the orthogonal projection of the first radiating element does not overlap with the second slot; and
a second radiating element electrically connected to a feeding element, wherein the second radiating element and the second slot are coupled with each other;
wherein a center line is defined along an extending direction of the first slot, and the center line is located between an upper edge and a lower edge of the second slot, and between an upper edge and a lower edge of the first slot.

2. The electronic device according to claim 1, wherein an orthogonal projection of the second radiating element that is projected onto the housing partially overlaps with the second slot, the first radiating element and the second slot are separate from and coupled with each other, and the second radiating element and the second slot are separated from each other.

3. The electronic device according to claim 1, wherein the second radiating element has a feeding point that is electrically connected to the feeding element, a center position between the third closed end and the open end defines a center line, and the feeding point is located between the center line and the open end.

4. The electronic device according to claim 1, wherein the second radiating element has a feeding point that is electrically connected to the feeding element, the upper edge and the lower edge of the second slot are connected between the open end and the third closed end, and the feeding point is located between a first position 2 mm away from the upper edge and a second position 1 mm away from the lower edge.

5. The electronic device according to claim 1, wherein the second closed end is located between the first closed end and the third closed end, an orthogonal projection of the first radiating element that is projected onto the housing is separated from the second closed end by a minimum horizontal distance, and the minimum horizontal distance ranges between 1 mm and 7 mm.

6. The electronic device according to claim 1, wherein the second closed end is located between the first closed end and the third closed end, the second closed end and the third closed end are separated from each other by a gap, and the gap ranges between 1 mm and 7 mm.

7. The electronic device according to claim 1, wherein the first radiating element and the second radiating element are separated from each other by a minimum distance, and the minimum distance is greater than 0.3 mm.

8. The electronic device according to claim 1, wherein the feeding element is used to excite the second slot to generate a first operating frequency band, the feeding element is used to excite the second radiating element and the second slot to generate a second operating frequency band, and the second operating frequency band is lower than the first operating frequency band; wherein the first radiating element, the second radiating element, the first slot, and the second slot jointly generate a third operating frequency band, and the third operating frequency band is lower than the first operating frequency band and the second operating frequency band.

9. The electronic device according to claim 1, wherein the first radiating element extends from the first end to the second end and has a first extending length between the first end and the second end; wherein the second radiating element has a third end and a fourth end, the third end is electrically connected to the feeding element, the second radiating element extends from the third end to the fourth end and has a second extending length between the third end and the fourth end, and the first extending length is greater than the second extending length.

10. An antenna structure disposed in a housing of an electronic device, the housing including a first slot and a second slot, the first slot and the second slot extending along a same direction, the first slot having a first closed end and a second closed end, the second slot having a third closed end and an open end, the antenna structure comprising:

a grounding element;

a first radiating element having a first end and a second end, wherein the first end is connected to the grounding element, the second end is located above and between the third closed end and the open end, an orthogonal projection of the first radiating element that is projected onto the housing partially overlaps with and crosses on the first slot, and the orthogonal projection of the first radiating element does not overlap with the second slot; and a second radiating element electrically connected to a feeding element, wherein the second radiating element and the second slot are coupled with each other;

wherein a center line is defined along an extending direction of the first slot, and the center line is located between an upper edge and a lower edge of the second slot, and between an upper edge and a lower edge of the first slot.

11. The antenna structure according to claim 10, wherein an orthogonal projection of the second radiating element that is projected onto the housing partially overlaps the second slot, the first radiating element and the second slot are separated from and coupled with each other, and the second radiating element and the second slot are separated from each other.

12. The antenna structure according to claim 10, wherein the second radiating element has a feeding point that is electrically connected to the feeding element, a center position between the third closed end and the open end defines a center line, and the feeding point is located between the center line and the open end.

13. The antenna structure according to claim 10, wherein the second radiating element has a feeding point that is electrically connected to the feeding element, the upper edge and the lower edge of the second slot are connected between the open end and the third closed end, and the feeding point is located between a first position 2 mm away from the upper edge and a second position 1 mm away from the lower edge.

14. The antenna structure according to claim 10, wherein the second closed end is located between the first closed end and the third closed end, an orthogonal projection of the first radiating element that is projected onto the housing is separated from the second closed end by a minimum horizontal distance, and the minimum horizontal distance ranges between 1 mm and 7 mm.

15. The antenna structure according to claim 10, wherein the first radiating element and the second radiating element are separated from each other by a minimum distance, and the minimum distance is greater than 0.3 mm.

16. The antenna structure according to claim 10, wherein the first radiating element extends from the first end to the second end and has a first extending length between the first end and the second end; wherein the second radiating element has a third end and a fourth end, the third end is electrically connected to the feeding element, the second radiating element extends from the third end to the fourth end and has a second extending length between the third end and the fourth end, and the first extending length is greater than the second extending length.

* * * * *